Sept. 7, 1948.   G. E. FRANCK   2,448,968
CONTROL DEVICE
Filed July 13, 1945
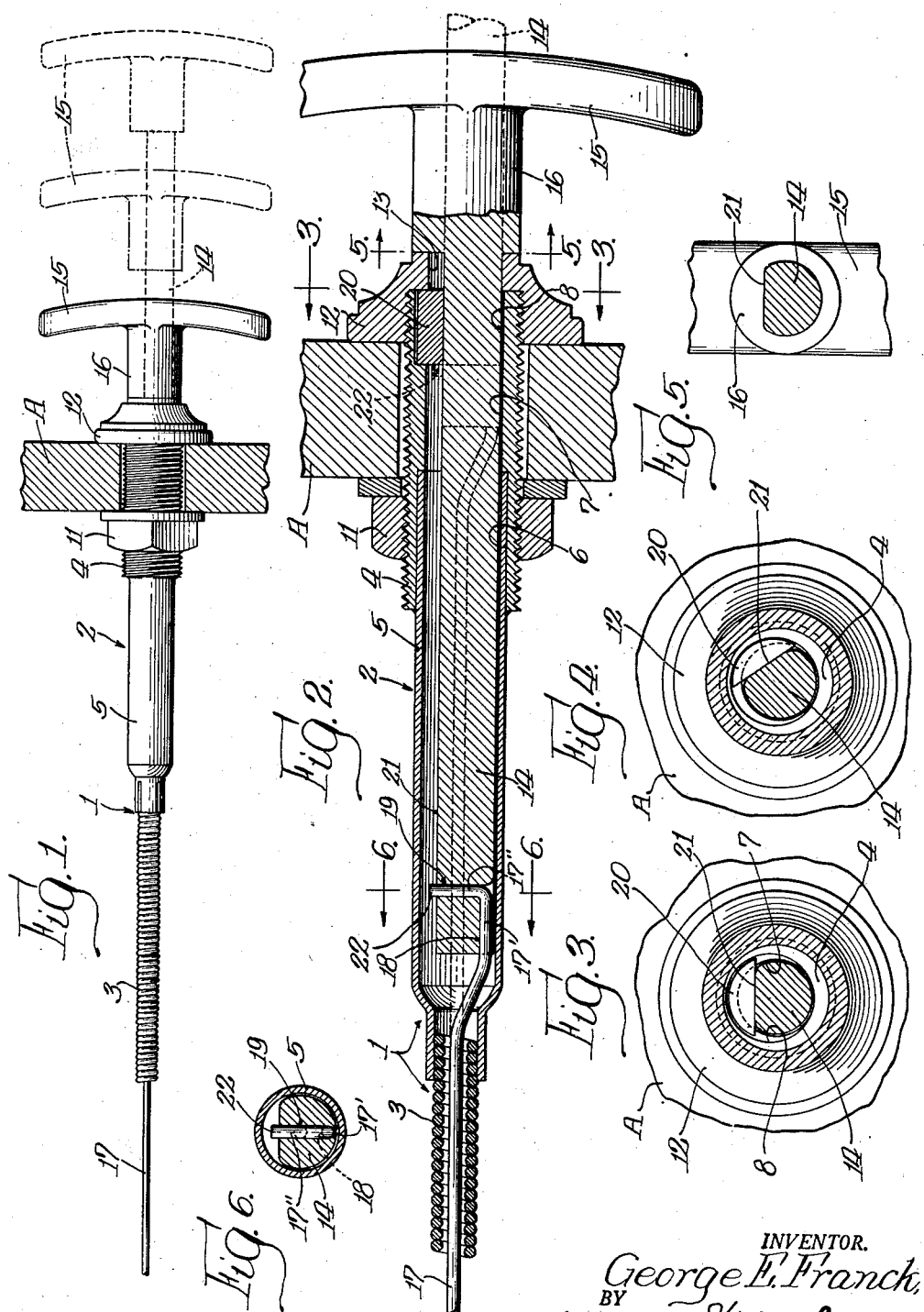
INVENTOR.
George E. Franck,
BY Patented Sept. 7, 1948

2,448,968

UNITED STATES PATENT OFFICE 2,448,968

CONTROL DEVICE

George E. Franck, Riverside, Ill., assignor to The Imperial Brass Manufacturing Company, Chicago, Ill., a corporation of Illinois Application July 13, 1945, Serial No. 604,898

8 Claims. (Cl. 74—502)

The present invention relates to that type of manually operable control device wherein an actuator in the form of a wire or small flexible rod, having at one end a handle or the like, is housed within and movable lengthwise of a long tubular sheathing that is fixed to a stationary support at the handle end of the actuator; and it has for an object to produce an improved device which can be manufactured at a substantially lower cost than is possible in the case of prior devices of similar grade or quality.

In devices of the type under consideration, the sheathing usually comprises a rigid tubular element, adapted to pass through a support as, for example, an instrument panel, and a coiled wire element, known as a Bowden tube, connected at one end to an end of the rigid tube; the exterior of the rigid tube being screw threaded to receive nuts to engage with opposite sides of the support. The handle end of the actuator usually comprises the handle proper and a long, stiff stem that is normally housed in the sheathing; the flexible element of the actuator being connected to the stem at a point within the rigid tubular element. Also, some means usually cooperates with the stem to lock the actuator in any position into which it may be shifted in the lengthwise direction.

One of the specific objects of the present invention is to improve the locking means for the actuator to which reference has just been made.

In attainment of this latter object, the interior of the rigid tubular element of the sheathing is machined to provide a surface for cooperation with a locking block engaged with the stem of the actuator. This, together with the external screw threads on such tubular element and the bearing for the stem, makes the machining of an element of the ordinary type awkward and costly. Another specific object of the present invention may be said to be the production of a tubular element of this kind that is novel in construction, easy to manufacture and less costly than if it were manufactured in the old way.

A still further specific object of the present invention is to connect the wire or other flexible member of the actuator element to the stiff stem member in a novel and effective way and, preferably, utilize the wire end as a stop pin on the stem member to prevent it from being pulled out of the supporting sheathing.

The various features of novelty whereby the present invention is characterized will hereinafter be pointed out with particularity in the claims; but, for a full understanding of the invention and of its objects and advantages, reference may be had to the following detailed description taken in connection with the accompanying drawing, wherein:

Fig. 1 is an elevational view of a device embodying the present invention and mounted on a panel, the operating handle of the device being shown in full lines in one extreme position and in broken lines in two other positions.

Fig. 2 is a view, on a larger scale than Fig. 1, illustrating the same parts in section on a plane containing the long axis of the rigid portion of the sheathing or housing.

Fig. 3 is a section on line 3—3 of Fig. 2.

Fig. 4 is a view similar to Fig. 3, with the stem of the actuator turned through an angle of about 45° from the position which it occupies in Fig. 3.

Figs. 5 and 6 are sections taken, respectively, on lines 5—5 and 6—6 of Fig. 2.

While the invention is susceptible of various modifications and alternative constructions, it is shown herein and will hereinafter be described in a preferred embodiment. It is not intended, however, that the invention is to be limited thereby to the specific construction disclosed. On the contrary it is intended to cover all modifications and alternative constructions falling within the spirit and scope of the invention as defined in the appended claims.

Referring to the drawing, I represents generally the tubular sheathing or housing for a flexible actuator in a common form of control device. This sheathing comprises a rigid tubular portion, generally designated 2, and a flexible tubular extension thereof designated 3. Ordinarily the rigid portion, by which the sheathing is supported, is made in one piece. According to the present invention, however, this rigid portion, for reasons to be explained, comprises two parts, a short sleeve 4 and a longer tube 5. The tube 5 is a simple, unthreaded, unmachined piece of steel tubing contracted at one end to fit snugly about an end of the flexible extension 3, herein a Bowden tube. The sleeve 4 on the other hand is externally screw threaded from end to end and is also machined internally to provide three bore sections 6, 7 and 8. The first of these has a diameter equal to the external diameter of the tube 5, and the second of these has a diameter equal to the internal diameter of the tube 5 and is concentric with the first bore section. The third, namely, the bore section 8, is of approximately the same diameter as the section 6, but is of such eccentricity that the periphery coincides at one point with the bore section 7 so that along a given line, herein the bottom of the rigid tubular portion 2, as viewed in Figs. 2, 3 and 4, the inner surface of the tube 5, the bore section 7, and the bore section 8 form a continuous straight line. As clearly seen in Fig. 2, the eccentric bore section 8 is of comparatively narrow axial dimension, while the concentric bore section 6 is of considerable axial dimension so as to receive enough of the tube 5 therein to form a rigid joint. In addition to the snug fit, the tube 5 is secured in the sleeve 4 by soldering or sweating.

The advantage of the two-piece rigid tubular portion is evident. Although the portion as a whole is quite long, only the short sleeve section need be machined, and this can be done easily. It is then a simple matter to attach the tube 5. This sleeve, moreover, need only be long enough to extend a short distance beyond the faces of a support A in which the device is mounted. Furthermore, only the sleeve need be of a metal or stock adapted to be screw threaded and otherwise machined, the tube being of any desired metal that is suitable for sheathing purposes.

The device may be supported by inserting the sleeve 4 through a hole in a wall A and clamping the wall between two nuts 11 and 12 screwed onto the sleeve on opposite sides of the wall. The nut 11, on the back side of the wall, may be any ordinary nut, but the nut 12 is in the form of a cap that covers the end of the sleeve and contains a central opening 13 of about the same diameter as the bore in tube 5.

Axially slidable and also limitedly rotatable relative to the sheathing is an actuator comprising a stiff stem 14 of round stock slightly smaller in diameter than the bore in the tube 5, so as to be receivable therein. On the outer end of the stem there is nonrotatably secured a handle 15 provided with a thick neck portion 16 that is adapted to engage the nut 12 when the stem is pushed into its inner limit. Attached to the inner end of the stem is a wire or small rod 17 which herein is attached in a novel way. In the periphery of the stem, at its inner end, is a longitudinal groove 18 that is preferably a little deeper than the diameter of wire 17. At the end of this groove, inwardly of the end of the stem, is a hole 19 that passes diametrically through the stem. The wire, which is first bent to provide an offset portion 17' and is then further bent so as to have the extreme end portion 17'' thereof lie at right angles to the offset portion, is assembled with the stem by inserting the portion 17'' in the hole 19 and laying the offset portion 17' in the groove 18. The metal of the stem, on opposite sides of and adjacent to the groove, is then swaged so as at least partly to close the groove and thus make the connection between the stem and the wire a permanent one.

As is the case with all control devices of the type to which the present invention belongs, some means preferably is provided to lock the actuator against lengthwise movement when desired. In the present arrangement, the locking is effected by a turning movement of the handle, so that the actuator may always be moved freely during intentional lengthwise shifting. The eccentric bore section 8, to which reference has heretofore been made, constitutes one element of the lock; the other element being a wedge block 20 that is compelled to rotate with the stem and thus binds in the eccentric bore section 8 and creates a positive lock upon turning the handle through a small angle. In the arrangement shown, the wedge block 20 is a segment of a cylinder of about the same diameter and about the same axial length as the eccentric bore section 8, and is mounted with its flat face or side engaging a flat surface 21 extending longitudinally of the stem. The parts are so proportioned that when the flat surface on the stem lies at right angles to the diameter of maximum eccentricity, as in Fig. 3, the block 20 is quite loose and offers no resistance to lengthwise movements of the stem. But, when the handle is turned, causing the block to move into an ever narrowing space, the block becomes wedged between the stem and the cylindrical surface of the eccentric bore, as shown in Fig. 4, and lengthwise movement of the stem is resisted. When the stem is again turned in the counterclockwise direction from the position indicated in Fig. 4 to that of Fig. 3, the locking action is terminated.

It will be seen that the hole 19 in the stem is at right angles to the flat surface on the stem. Therefore, by permitting the right angular portion 17'' of the wire to project from the hole, as indicated at 22 in Figs. 2 and 6, the stem is provided with a stop to engage the block 20 when the stem is pulled far enough forward. Thus the stem is prevented from being separated from the support as long as nut 12 is in place. However, when this nut is unscrewed, allowing the locking block to be taken out, the stem itself may be removed.

The stem 14 has been described as being of about the same diameter as the bore in the tube 5 in order to have a good working fit in that member. However, if desired, the stem may be a closer fit in the bore section 7 and in the hole 13 in nut 12, as these can be accurately machined. The manner of assembly and installation will readily be understood, it is believed, from the foregoing description.

In mounting the control device on a dashboard or control panel, the nut 11 is customarily removed and the control device inserted through the hole in the dashboard, with the Bowden tube inserted first. When the control device is in position with the nut 12 abutting the dashboard, the nut 11 is then passed back over the Bowden tube and the tube 5 and threaded onto the sleeve 4. It will be seen with this construction that the nut 11 need be given but a few turns and it is tightened up, whereas, were the rigid member 2 in one piece, the nut would have to be turned onto the device from the very end of the tube 5, or a distance about four times that in the present construction. Frequently the location of the control device is such that it is awkward to turn the nut 11 and the advantage of a short threaded portion thus becomes readily apparent.

On occasions it may be necessary or desirable to mount the control device in the opposite manner, namely, by inserting the device into the panel from the rear to the front. This is herein made possible by the construction wherein the nut 12 and the wedge block 20, in assembled position, retain the stem 14 and the wire 17 from being pulled completely out of the sheathing, but when the nut 12 and the wedge block are removed the actuator, likewise, may be withdrawn from the sheathing. Under these conditions, the rigid portion 2 may be inserted from the rear to the front of the support A, the wire 17 and the stem 14 with the nut 12 thereon threaded back through the sheathing, the wedge block 20 reinserted, and the nut 12 turned onto the sleeve 14 to clamp the device in the control panel.

In using the device, the handle is simply pushed and pulled in the usual manner, the turning movements serving to lock the actuator and unlock it but not to make the adjustments thereof through which control is exercised. With the parts in the positions illustrated in full lines in Figs. 1, 2 and 3, the stem may be withdrawn from the sheathing as far as desired within the limits of movement which the construction permits. The greatest withdrawal that can be achieved depends on the distance of the stop pin 22 on the stem from the inner end of the lock block at the time that the neck on the handle contacts the nut 12. No matter what the lengthwise position of the handle or stem is, the turning of the handle to the right or left through an acute angle securely locks the stem in that position and holds it there until the handle is turned back to the release position.

I claim as my invention:

1. A control device comprising a stationary tubular support, an actuator extending through the support and fitted therein so as to be capable of moving lengthwise and turning about its axis relatively thereto, said support containing an eccentrically disposed bore section, a locking block located in said eccentric bore section and engaged with the side of the actuator, the sides of the actuator and block in engagement with each other being so shaped that the block may remain stationary when the actuator moves lengthwise but must turn with the actuator when the latter turns, and the parts being so proportioned that when the actuator is in one angular position it can move freely and when it is turned from that position the block binds in the support and locks the actuator.

2. A device as set forth in claim 1, wherein the locking block is a segment of a cylinder of about the same diameter as the eccentric bore section in the support.

3. A control device comprising a stationary tubular support, an actuator extending through the same and having the capacity to move lengthwise of and to turn within the same, one end of the bore in said support being eccentric to the remainder, a locking block about as long as the length of said eccentric bore section positioned in the latter and engaged with the actuator so as to turn with the same and be freely movable, relatively thereto, in the lengthwise direction, a cap nut on the support to hold the block in the bore, and the block being shaped to bind against the support when the actuator is moved from a predetermined angular position and to release its hold when the actuator is returned to that position.

4. A control device comprising a stationary tubular support, a stem extending into the same through one end and having the capacity to move lengthwise and to turn about its axis, said support at the end receiving said stem containing a short, eccentric bore section, and a locking block positioned in the eccentric bore section and engaged with the side of the stem so as to be compelled to turn with the same while leaving the stem free to move lengthwise relatively thereto except when the block binds against the support, the block being of such size and shape that when the stem is in one angular position the block is loose in the bore while in other angular positions it binds against the support.

5. A control device comprising a rigid tubular portion adapted to be mounted in a support including an externally threaded sleeve member adapted to extend through a hole in the support, a nut threaded onto said sleeve member on opposite sides of the support to clamp the support therebetween and thereby rigidly secure said sleeve member, said sleeve member having formed therein a concentric bore extending over the major length thereof and an eccentric bore section at one end of said member, and a tube having an external diameter equal to the diameter of the concentric bore in said sleeve member and received and secured firmly in said sleeve member, the eccentricity of said eccentric bore section being substantially equal to the wall thickness of said tube so as to have the inner surface of the tube and the inner surface of said bore section flush at one point, an actuator comprising a handle and a stem, said stem being receivable within said tubular portion for relative axial and rotational movement and said stem having a flat surface extending over a major portion of the length of said stem, and means in the eccentric bore section operable to lock said stem in any axial position thereof by simple rotation of the stem comprising a segmental block cooperating with the flattened surface on said stem to permit longitudinal movement of said stem when in one angular position but operating upon rotation of said stem in either direction away from said one position to lock said actuator against longitudinal movement.

6. A control device comprising, in combination, a sheathing having a rigid portion and a flexible coiled wire portion, means carried by said rigid portion for mounting the same in a support, an actuator extending through said sheathing, said actuator comprising a rigid stem and a wire secured to the inner end of said stem, means for limiting longitudinal withdrawal movement of the rigid stem of said actuator from said sheathing, said wire being secured to said stem with the end thereof projecting laterally beyond the surface of said stem to form a stop element limiting the extent of longitudinal withdrawal of said actuator in the assembled condition of the control device, and means interposed between said stem and the rigid portion of said sheathing operable to limit rotational movement of said actuator relative to said sheathing and to lock said actuator in any position of longitudinal adjustment by rotation of said actuator.

7. A control device comprising, in combination, a tubular sheathing including a rigid tubular portion and a flexible portion, said tubular portion at the end opposite said flexible portion having an eccentric bore, an actuator extending through said sheathing comprising a rigid stem of round stock having a flat surface portion extending longitudinally thereof and a wire secured to the inner end of said stem, said wire having the end thereof projecting at right angles through and beyond the flat surface of said stem to form a limit stop, means for locking said actuator in various longitudinal positions including a segment of a cylinder interposed between the flat surface of said stem and the eccentric bore section, and a nut threaded onto said rigid portion of the sheathing for retaining said cylinder segment against longitudinal movement and for aiding in clamping the control device in a support.

8. In a control device of the character described, a tubular support and sheathing including a piece of tubing and an externally screw threaded machined sleeve that is relatively short and thick-walled, the tubing and the sleeve being in telescoped relation through a substantial part of the length of the sleeve, a short section of the sleeve at the end opposite said tubing containing a bore that is eccentric to the bore in the sleeve.

GEORGE E. FRANCK.

REFERENCES CITED

The following references are of record in the file of this patent:

UNITED STATES PATENTS

| Number | Name | Date |
|---|---|---|
| 1,567,850 | Long | Dec. 29, 1925 |
| 1,717,948 | Stokes | June 18, 1929 |
| 1,911,540 | Weatherhead | May 30, 1933 |
| 1,918,792 | Arens | July 18, 1933 |
| 1,953,188 | Norviel | Apr. 3, 1934 |
| 2,019,460 | Mahan | Oct. 29, 1935 |
| 2,044,492 | Baldwin | June 16, 1936 |
| 2,101,160 | Weber | Dec. 7, 1937 |
| 2,112,722 | Weber | Mar. 29, 1938 |
| 2,183,824 | Smith | Dec. 19, 1939 |
| 2,330,443 | Norton | Sept. 28, 1943 |

FOREIGN PATENTS

| Number | Country | Date |
|---|---|---|
| 409,153 | Germany | Feb. 3, 1925 |
| 502,490 | Great Britain | Mar. 20, 1939 |
| 749,944 | France | May 15, 1933 |